United States Patent
Hsiao et al.

(10) Patent No.: US 7,598,650 B2
(45) Date of Patent: Oct. 6, 2009

(54) MOTOR MECHANISM OF DC INVERTER-FED COMPRESSOR

(75) Inventors: Tse-Liang Hsiao, Hsinchu (TW); Pei-Yu Yu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 39 days.

(21) Appl. No.: 11/645,723

(22) Filed: Dec. 27, 2006

(65) Prior Publication Data

US 2008/0136280 A1 Jun. 12, 2008

(30) Foreign Application Priority Data

Nov. 10, 2006 (TW) ............... 95141733 A

(51) Int. Cl.
*H02K 1/22* (2006.01)
(52) U.S. Cl. ........................ 310/261; 310/81
(58) Field of Classification Search ................ 310/261, 310/81, 216, 217, 218
See application file for complete search history.

(56) References Cited

U.S. PATENT DOCUMENTS

| | | | | |
|---|---|---|---|---|
| 2,089,626 A | * | 8/1937 | Smith | 417/369 |
| 3,584,980 A | * | 6/1971 | Cawley et al. | 417/372 |
| 3,965,382 A | * | 6/1976 | McCrosky et al. | 310/261 |
| 4,388,756 A | * | 6/1983 | Burns | 29/598 |
| 4,644,201 A | * | 2/1987 | Tani et al. | 310/51 |
| 5,635,778 A | * | 6/1997 | Fujita et al. | 310/51 |
| 2002/0175584 A1 | * | 11/2002 | Koharagi et al. | 310/156.56 |

FOREIGN PATENT DOCUMENTS

JP 01-152935 * 6/1989

* cited by examiner

*Primary Examiner*—Hanh N. Nguyen
(74) *Attorney, Agent, or Firm*—Birch, Stewart, Kolasch & Birch, LLP

(57) ABSTRACT

A motor mechanism of DC inverter-fed compressor is disclosed, wherein a motor rotor includes a first rotor layer, a second rotor layer and a third rotor layer, made up respectively of a plurality of rotor units stacked together. The rotor units have a shaft hole in the middle and have at least one magnet slot that install a permanent magnet at every quarter surface area of the rotor units. The rotor units of the first rotor layer have a plurality of first holes at one of the quarter areas thereon, and the rotor units of the third rotor layer have a plurality of third holes, which are set up at an area opposing the first holes. The present invention can reduce the height of the compressor, the costs of parts and assembly, and increase the total efficiency of the motor and the compressor.

5 Claims, 7 Drawing Sheets

MOTOR MECHANISM OF DC INVERTER-FED COMPRESSOR

BACKGROUND OF THE INVENTION

1. Field of the Invention

The present invention relates to a motor mechanism, more particularly a motor mechanism of DC inverter-fed compressor that effectively reduces the height of compressor, cuts the costs of parts and assembly, and improves the overall performance of motor and compressor.

2. Description of the Related Art

The DC inverter-fed reciprocating compressor for refrigeration and air conditioning systems as shown in FIG. 1 works as follows: low pressure/temperature refrigerant gas enters the suction inlet 2 on the housing 1 into the intake chamber 3, reaches inside the cylinder 5 via the suction passage of valve seat 4, and undergoes compression by the pistons 6, where the refrigerant is compressed into high pressure/temperature gas, which then enters the discharge chamber 8 via the pipes 7 and is discharged outside the compressor via the refrigerant outlet 9.

The motor stator 13 is fixed inside the compressor, while motor rotor 10 uses the eccentric shaft design to drive piston 6 and other parts of compressor in the refrigerant compressor process. Because of its eccentric shaft design, motor rotor 10 must have a counterweight balance arranged at a relative position, which is typically achieved by arranging a proper balance weight at the upper and lower sides of the rotor 10 to let it attain dynamic balancing during the rotation of motor as shown in FIG. 2 and FIG. 3.

FIG. 4 shows the resultant force of motor components of a conventional DC inverter-fed compressor, in which, F1 represents the centrifugal force and equivalent force generated by the assembly of piston 6, connecting rod and eccentric shaft, F2 represents the centrifugal force generated by the upper balance weight 11 of rotor, and F3 represents the centrifugal force generated by lower balance weight 12 of rotor. In order for the rotor to achieve dynamic balancing in the compressor, both the resultant force and resultant moment of force in FIG. 4 must be zero. Zero resultant force means $F2=F1+F3$, and zero resultant moment of force means $F2 \times L2 = F1 \times (L1+L2)$. Because $F2=F1+F3$, $F2>F3$, that is $H1>H2$, meaning the height H1 of balance weight 11 exceeds that of balance weight 12.

The approach described above poses two problems. One is the arrangement of balance weights increase the height of compressor, which means the compressor will take more space in order to hold its components, thereby disallowing small, thin and light-weight design that tends to be more competitive on the market. The other problem is that the upper and lower balance weights and their attachment to each side of motor rotor are structurally complex and add to the processing work and assembly costs.

SUMMARY OF THE INVENTION

The object of the present invention is to provide a motor mechanism of DC inverter-fed compressor, which can effectively reduce the height of compressor, lower the costs of parts and assembly, render the compressor smaller, lighter and thinner, and at the same time, enhance the motor performance.

To achieve the aforesaid object, the present invention provides a motor mechanism of DC inverter-fed compressor, which comprises a first rotor layer made up of a plurality of first rotor units stacked together, having at least one magnet slot able to hold a permanent magnet at every quarter surface area of the first rotor units, and having a plurality of first holes configured at one of the quarter areas of the first rotor units; a second rotor layer made up of a plurality of second rotor units stacked together and having the magnet slot at every quarter surface area of the second rotor units; a third rotor layer made up of a plurality of third rotor units stacked together, having the magnet slot at every quarter surface area of the third rotor units, and having a plurality of third holes in the third rotor units and configured at an area opposing the first holes, wherein the second rotor layer is disposed between the first rotor layer and the third rotor layer; and a shaft hole configured at the center of the first, the second and the third rotor units.

To achieve the aforesaid object, the motor mechanism of DC inverter-fed compressor according to the invention comprises a plurality of fourth rotor units with at least one magnet slot able to hold a permanent magnet at every quarter surface area of the fourth rotor units, and having a plurality of first holes and a plurality of third holes configured on two opposing areas of the fourth rotor units; a first rotor layer made up of the plurality of fourth rotor units stacked together, and the plurality of first holes being stuffed with magnetically non-conductible material; a second rotor layer made up of the plurality of fourth rotor units stacked together; a third rotor layer made up of the plurality of fourth rotor units stacked together and the plurality of third holes being stuffed with magnetically non-conductible material, wherein the second rotor layer is disposed between the first rotor layer and the third rotor layer; and a shaft hole configured at the center of the fourth rotor units.

To achieve the objects and effect described above, the means and construction employed by the present invention and its features and functions are illustrated in detail with preferred embodiments and accompanying drawings.

DETAILED DESCRIPTION OF THE INVENTION

Figure 1:
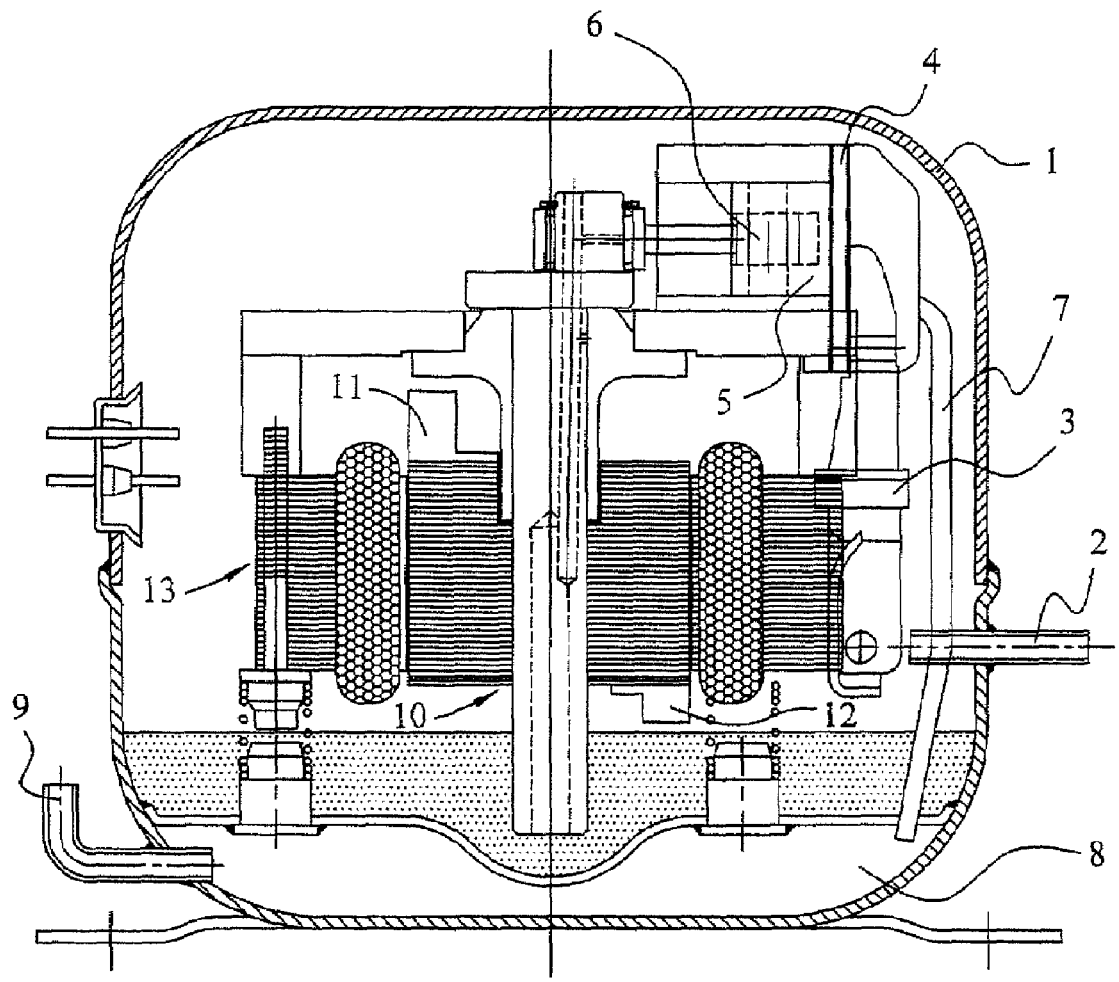
FIG. 1 is an assembly diagram of a conventional DC inverter-fed compressor.
Figure 2:
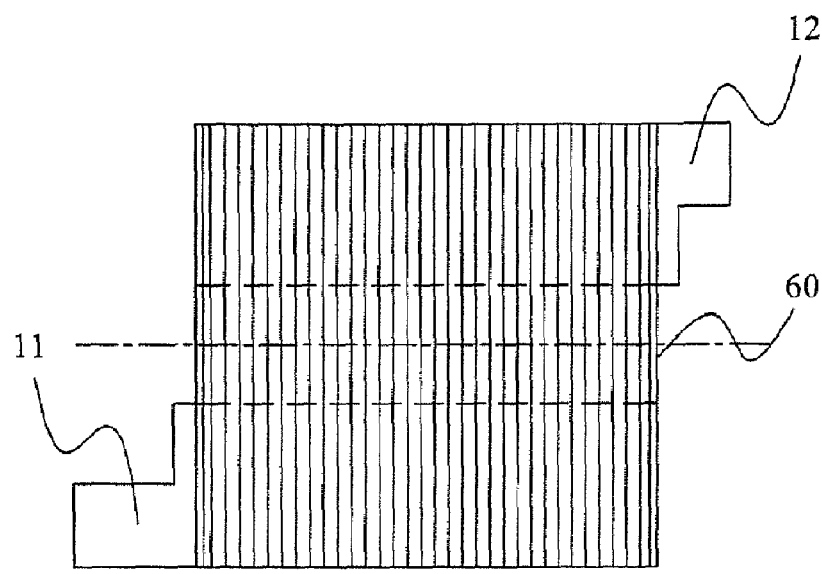
FIG. 2 is a side view of the motor mechanism of a conventional DC inverter-fed compressor.
Figure 3:
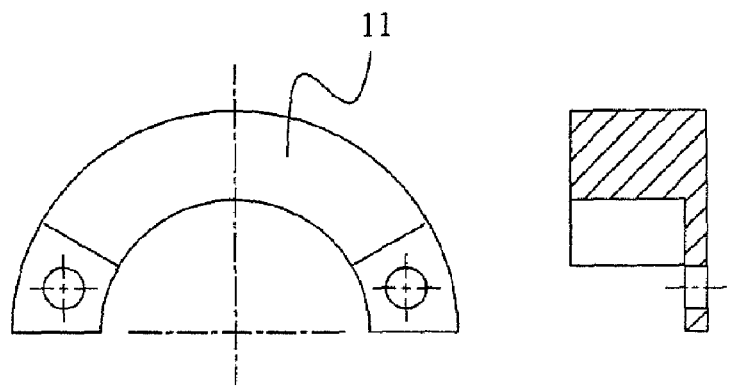
FIG. 3 is a front view and a side view of the balance weight.
Figure 3:
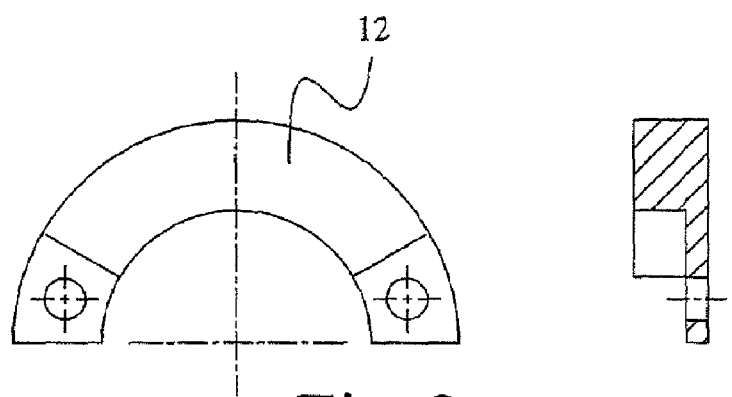
Figure 4:
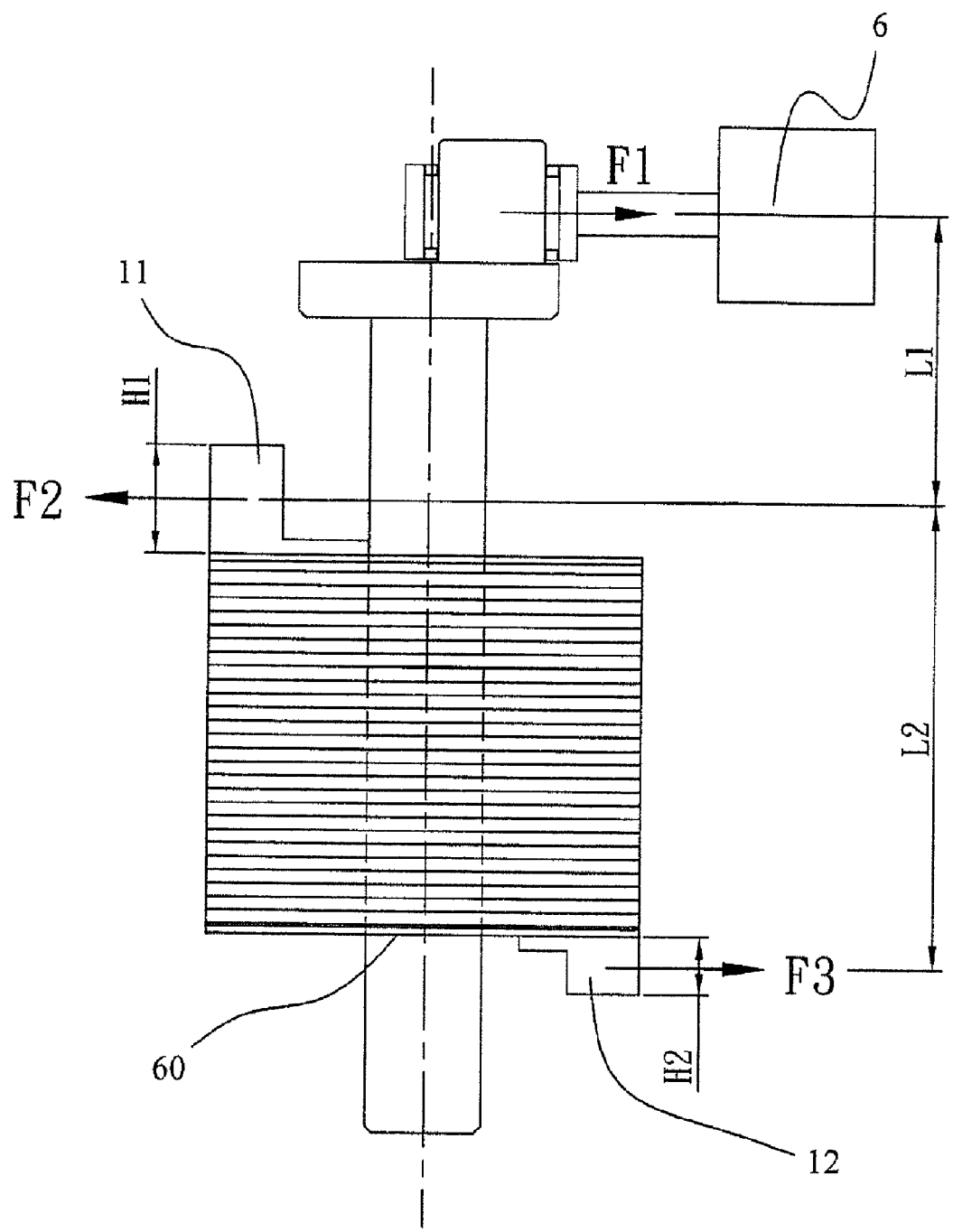
FIG. 4 is a diagram showing the resultant force of motor components of a conventional DC inverter-fed compressor.
Figure 5A:
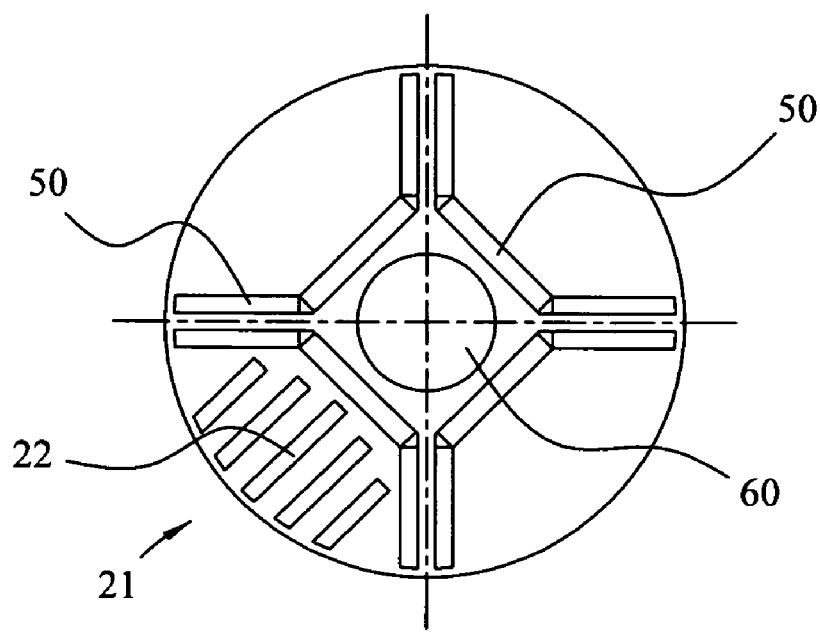
FIGS. 5A, 5B and 5C are respectively a front view of the first rotor, second rotor, and third rotor of motor mechanism of DC inverter-fed compressor according to a first embodiment of the invention.
Figure 5B:
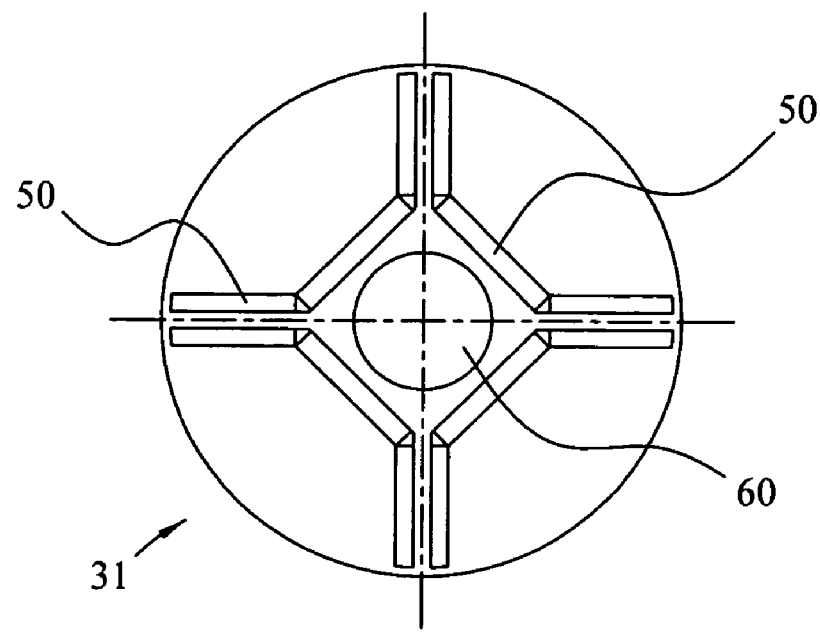
Figure 5C:
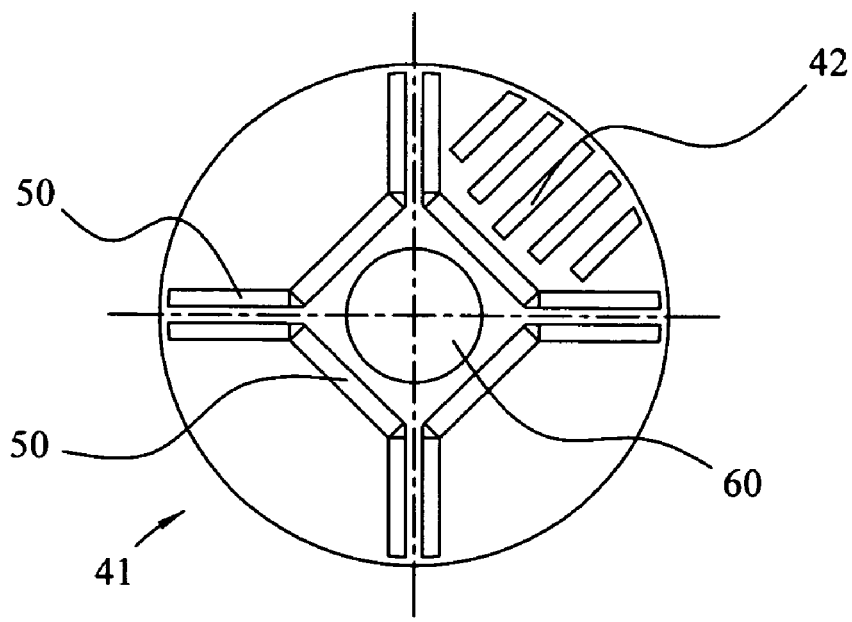
Figure 6:
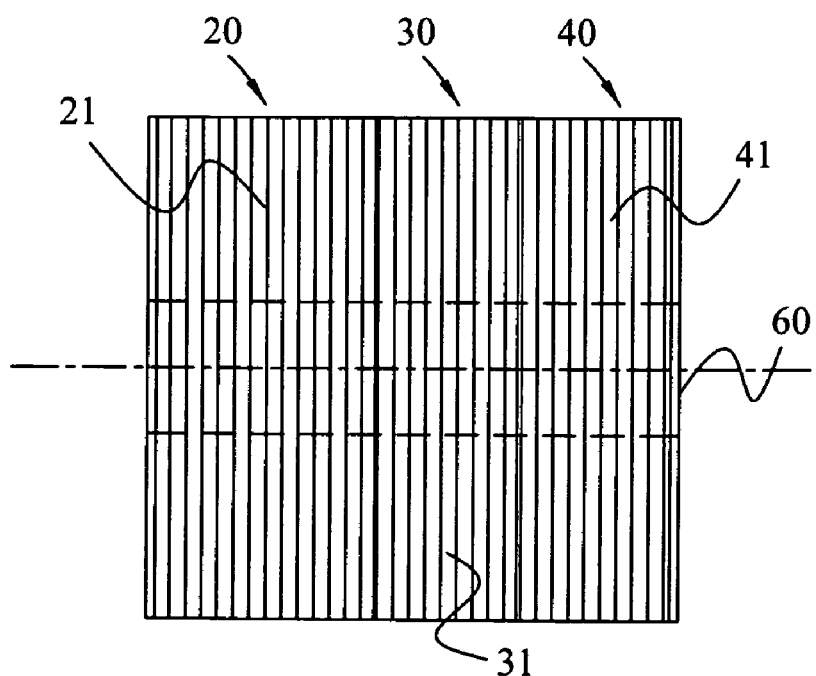
FIG. 6 is a side view of the motor mechanism of DC inverter-fed compressor according to the first embodiment of the invention.

The present invention provides a motor mechanism of DC inverter-fed compressor. Referring to FIGS. 5A, 5B, 5C and 6, which are respectively a front view of the first, second, and third rotor units and a side view of the motor mechanism of DC inverter-fed compressor according to a first embodiment of the invention, the motor mechanism of DC inverter-fed compressor comprises a first rotor layer 20, a second rotor layer 30, a third rotor layer 40, and a shaft hole 60. The first rotor layer 20 is made up of a plurality of first rotor units 21 stacked together, and at least one magnet slot 50 able to hold a permanent magnet is provided at every quarter surface area of the first rotor units 21. The quantity and shape of magnet slot 50 may vary depending on design needs; the magnet slot 50 can be longitudinal or polygonal in shape. A plurality of first holes 22 are provided at one of the quarter areas of first rotor unit 21. The second rotor layer 30 is made up of a plurality of second rotor units 31 stacked together, and the magnet slot 50 is provided at every quarter surface area of the second rotor units 31. The third rotor layer 40 is made up of a plurality of third rotor units 41 stacked together, and the magnet slot 50 is provided at every quarter surface area of the third rotor units 41. The third rotor unit 41 is provided with a plurality of third holes 42, which are disposed at an area opposing the first holes 22. The centers of the first, second, and third rotor units 21, 31, 41 are respectively designed with the shaft hole 60 for the installation of a spindle. The shape and arrangement of the first and the third holes are designed based on needs. The second rotor layer 30 is disposed between the first rotor layer 20 and the third rotor layer 40. The first, second, and third rotor units 21, 31, 41 are silicon steel sheets.

Figure 7:
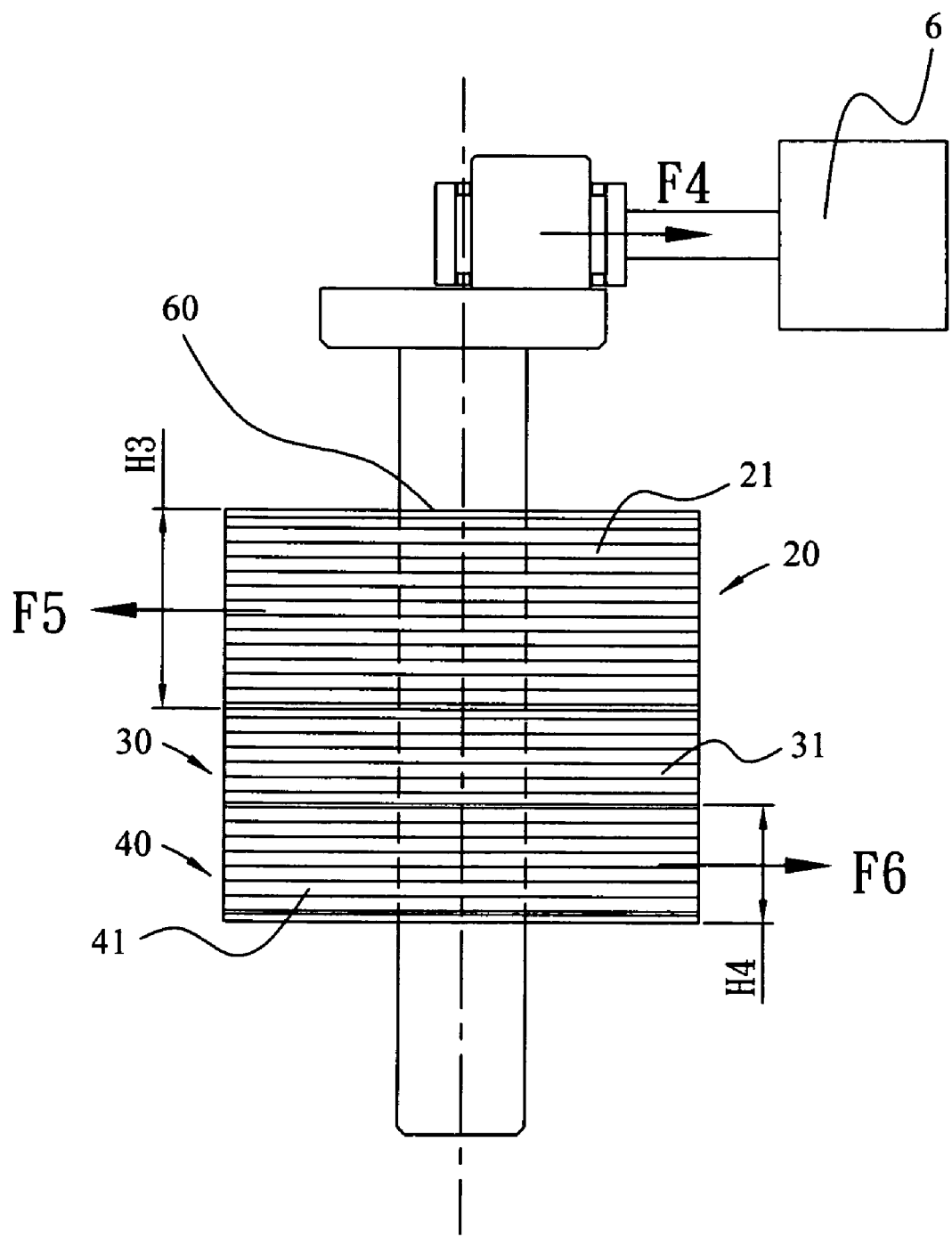
FIG. 7 is a diagram showing the resultant force of motor components of a DC inverter-fed compressor according to the invention.

Due to the eccentric shaft design of motor rotor 10 in the compressor, it requires a corresponding counterweight balance to let the rotor 10 attain dynamic balancing during rotation, thereby reducing the vibration and noise of rotor 10. Referring to FIG. 7, which shows the resultant force of motor components of DC inverter-fed compressor according to the invention, in which, F4 represents the centrifugal force and equivalent force generated by the assembly of piston 6, connecting rod and eccentric shaft, F5 represents the centrifugal force of first rotor layer 20, and F6 represents the centrifugal force of third rotor layer 40. In order for the rotor to achieve dynamic balancing, the height H3 of first rotor layer 20 is greater than the height H4 of the third rotor layer 40 to bring the resultant force and resultant moment of force to zero. Thus the invention uses the first, second and third rotor layers 20, 30, 40 to replace the conventional motor rotor structure 10 with an upper and lower balance weights 11, 12. That is, a motor rotor structure 10 made up of a first, second and third rotor layers 20, 30, 40 of different heights (stacked up by a plurality of rotor units) can achieve dynamic balancing in the compressor, and furthermore, reduce the height of compressor, and cut the costs of parts and assembly.

To obtain proper heights for first, second and third rotor layers 20, 30, 40 to achieve the dynamic balancing of rotors, analytical software (e.g. Pro-e) is employed for simulation and calculating the heights of first, second and third rotor layers 20, 30, 40, and based on which, to obtain the quantities of first, second and third rotor units 21, 31, 41. First, 3D simulation of the compressor components is carried out, and the shapes and arrangement of the first and third holes 22, 42 are designed according to needs by inputting the design parameters, such as length, width, material and weight of the first and third holes 22, 42 into the software for analysis. The analytical outcome should satisfy the criteria that the resultant force and resultant moment of force of compressor components are equal to zero to achieve the dynamic balancing of rotors. If such outcome is not obtained, the heights of first, second, and third rotor layers can be increased or decreased to achieve dynamic balancing.

Figure 8:
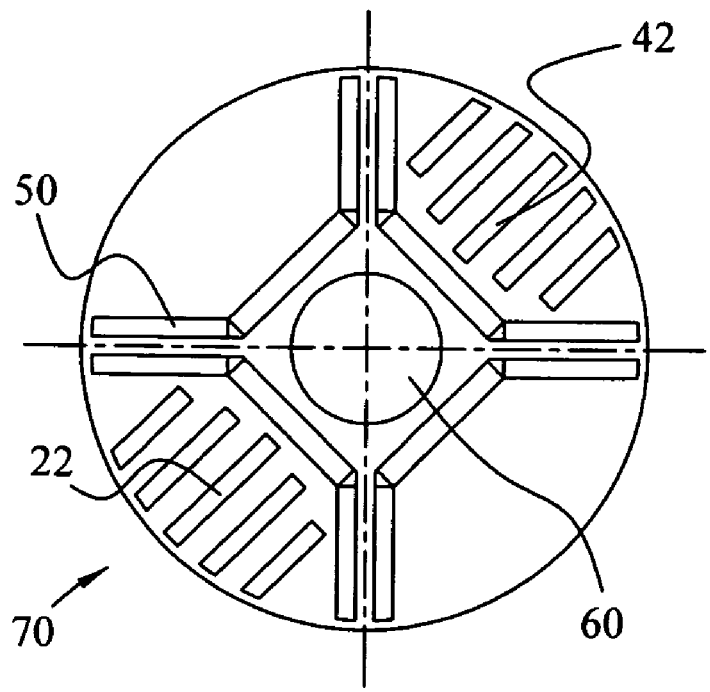
FIG. 8 is a front view of the motor mechanism of DC inverter-fed compressor according to a second embodiment of the invention.
Figure 9:
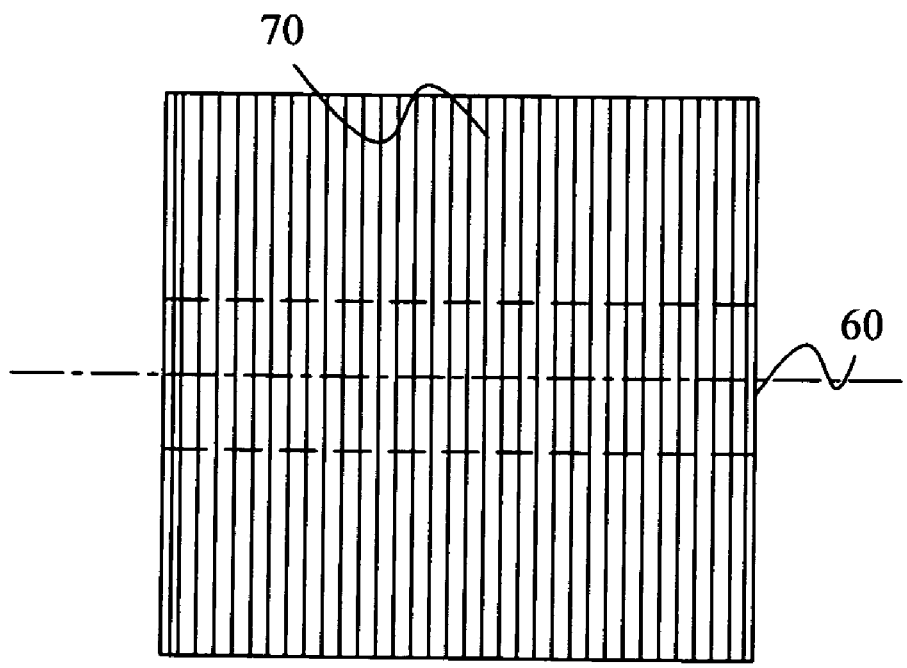
FIG. 9 is a side view of the motor mechanism of DC inverter-fed compressor according to a second embodiment of the invention.

FIG. 8 and FIG. 9 are respectively a front view and a side view of the motor mechanism of DC inverter-fed compressor according to a second embodiment of the invention. The motor mechanism of DC inverter-fed compressor according to the invention comprises a plurality of fourth rotor units 70 with at least one magnet slot 50 able to hold a permanent magnet at every quarter surface area of the fourth rotor units 70, and having a plurality of first holes 22 and a plurality of third holes 42 configured on two opposing areas of the fourth rotor units 70, and the fourth rotor units 70 are silicon steel sheets; a first rotor layer 20 made up of the plurality of fourth rotor units 70 stacked together, and the plurality of first holes 22 being stuffed with magnetically non-conductible material; a second rotor layer 30 made up of the plurality of fourth rotor units 70 stacked together; a third rotor layer 40 made of the plurality of fourth rotor units 70 stacked together and the plurality of third holes 42 being stuffed with magnetically non-conductible material, which is metal, such as copper, wherein the second rotor layer 30 is disposed between the first rotor layer 20 and the third rotor layer 40; and a shaft hole 60 configured at the center of the fourth rotor units 70. The first embodiment and the second embodiment of the invention are similar. In the second embodiment, the heights of the first, second and third rotor layers 20, 30, 40 are also calculated using analytical software. The first, second and third rotor layers are employed in place of the upper and lower balance weights 11, 12 used in conventional motor mechanism to achieve dynamic balancing of rotors.

In summary, the motor mechanism of the DC inverter-fed compressor of the invention uses first, second and third rotor layers to replace the convention motor mechanism with upper and lower balance weights, and achieves dynamic balancing of rotors through varying heights of the first, second and third rotor layers, which helps reduce the height of compressor, and cut the costs of parts and assembly. The present invention meets the essential elements of patent.

What is claimed is:

1. A motor mechanism of DC inverter-fed compressor, comprising:
    a first rotor layer made up of a plurality of first rotor units stacked together, the first rotor unit having at least one magnet slot capable of holding a permanent magnet at every quarter surface area thereon and having a plurality of first holes at one of the quarter areas;
    a second rotor layer made up of a plurality of second rotor units stacked together, the second rotor unit having the magnet slot at every quarter surface area thereon;
    a third rotor layer made up of a plurality of third rotor units stacked together, the third rotor unit having the magnet slot at every quarter surface thereon and having a plurality of third holes at one of the quarter areas, the third holes being configured at an area opposing the first holes, wherein the second rotor layer is disposed between the first and the third rotor layers; and
    a shaft hole disposed at the center of the first, second and third rotor units,
    wherein the respective heights of the first rotor layer, second rotor layer and third rotor layer are adjusted by adjusting the respective amounts of the first rotor units, second rotor units and third rotor units to achieve dynamic balancing.

2. The motor mechanism according to claim 1, wherein the first rotor units are silicon steel sheets.

3. The motor mechanism according to claim 1, wherein the second rotor units are silicon steel sheets.

4. The motor mechanism according to claim 1, wherein the third rotor units are silicon steel sheets.

5. The motor mechanism according to claim 1, wherein the height of first rotor layer is greater than that of third rotor layer.

* * * * *